Figure 1:
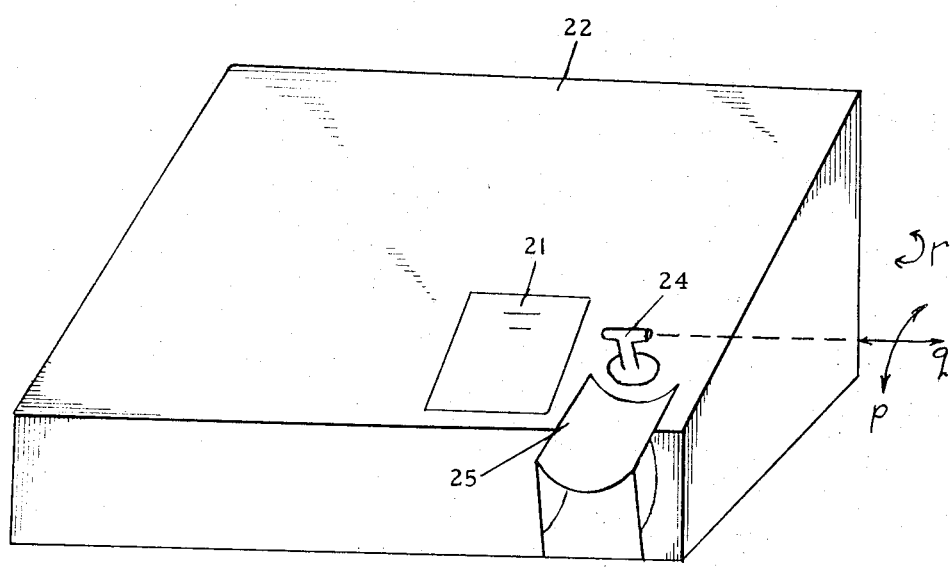

Dec. 12, 1967  C. R. KELLEY  3,357,115
PSYCHOMOTOR PERFORMANCE TESTING APPARATUS
Filed April 25, 1966  12 Sheets-Sheet 1

Charles R. Kelley
INVENTOR.

Dec. 12, 1967   C. R. KELLEY   3,357,115
PSYCHOMOTOR PERFORMANCE TESTING APPARATUS
Filed April 25, 1966   12 Sheets-Sheet 11

United States Patent Office 3,357,115
Patented Dec. 12, 1967

3,357,115
PSYCHOMOTOR PERFORMANCE TESTING APPARATUS
Charles R. Kelley, Panorama City, Calif., assignor to Dunlap and Associates, Inc., Darien, Conn., a corporation of Delaware
Filed Apr. 25, 1966, Ser. No. 544,938
22 Claims. (Cl. 35—22)

The present invention relates to psychomotor performance test apparatus, and more particularly to apparatus designated to test the skill of a trained operator in keeping one or more indicators aligned with a respective reference, which may be fixed, or moving in spite of disturbances introduced into the system which cannot be anticipated by the operator.

Many tests of motor skills are well known to psychologists, to classify and select potential employees, operators or pilots; the present invention tests manual control, or tracking and is designed to measure the performance of already skilled personnel, such as test pilots or astronauts during interruptions of their normal duties. A principal purpose of the test is to detect any change in skill due to such factors as extended confinement, weightlessness, fatigue, toxic effects of artificial atmospheres, response to stress, or the like. The test apparatus is designed to provide tests especially for skilled subjects rather than novices.

It is an object of the present invention to provide a test apparatus which gives an indication of variation of skills already acquired.

Briefly, in accordance with the present invention, the psychomotor performance testing apparatus has a movable hand controller. The freedom of movement may be in 1, 2, or more planes, such as in an up and down motion, a right and left motion, and a twisting motion. Each one of these motions, if more than one are to be used, generates, for example by means of a potentiometer or an on-off switch, a signal representative of the position of the hand controller in a respective direction. A forcing function generator is provided which generates a disturbance signal. In accordance with one embodiment of the invention, this disturbance signal is displayed on a display unit; in accordance with another embodiment, however, it is not. In either case, the disturbance signal is introduced into the channel, or into each one of the channels corresponding to the directions of motion of the hand controller. The signals are summed, integrated twice, and displayed on an indicator, one for each direction of motion to be tested, with respect to a zero or null position, or in the alternative, with respect to the indication of the variation in the forcing function. It is now the aim of the operator to reduce the error introduced into the system by the forcing function signal to zero.

The proportion of time the error is within a tolerance band as opposed to outside of the tolerance band is a measure of skill of the operator. The operator's performance can also be measured by the root mean square error, integrated absolute error, time within a reduced tolerance band, or other standard method of measuring tracking performance. In order to provide an accurate measure of the skill, however, a signal representative of the error is fed back to the forcing function generator to control the forcing function in order to make the problem, that is the disturbance introduced into the apparatus, more or less difficult depending upon the performance of the operator in reducing the error to zero. Thus, if it is desired to test response time, the frequency of the disturbance signal can be reduced if the error is too large; or, the amplitude can be reduced; or, if the operator is readily able to keep the indicator null, the problem can be made more difficult by increasing both frequency and amplitude of the disturbance signals introduced into one, or more, or all channels (if more than one is used) corresponding to the various directions.

Many variations of problems suggest themselves; for example, and in accordance with a particularly useful test, the maximum deviation of the indicator from zero, or null is sensed, and utilized as both a measure of the performance, that is as a control to display the result of the tracking, and as a control for the forcing function generator. Thus, if the operator is good at maintaining two out of the three directions close to the zero or null position, the total score or performance is still not judged good because the combination of all three signal channels must be brought to zero.

Figure 2:
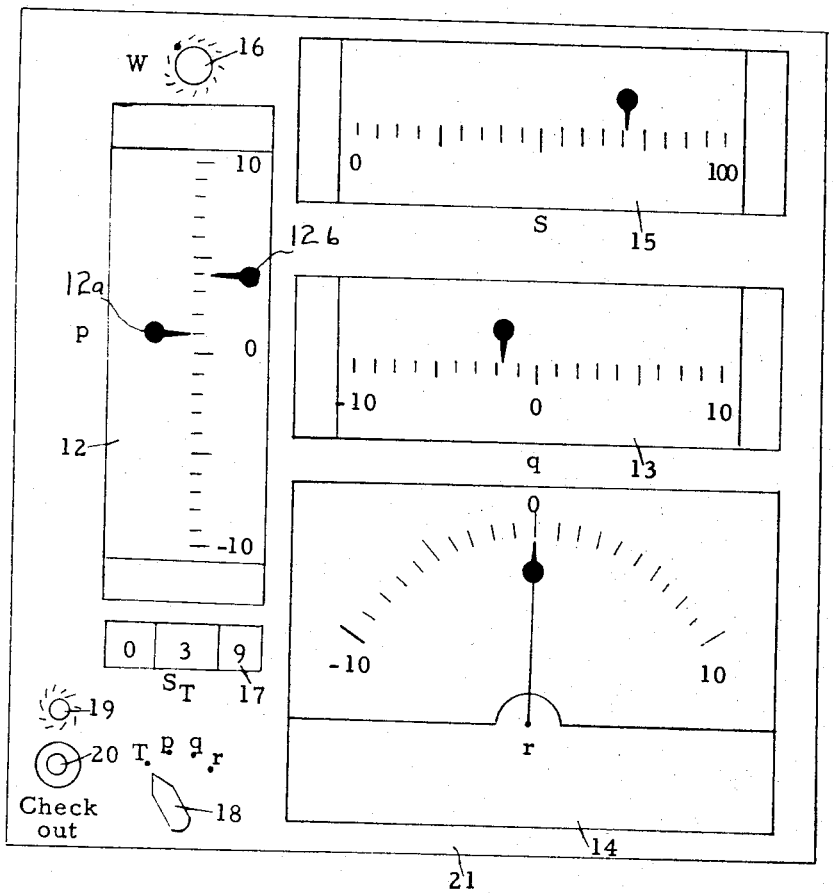
Figure 3:
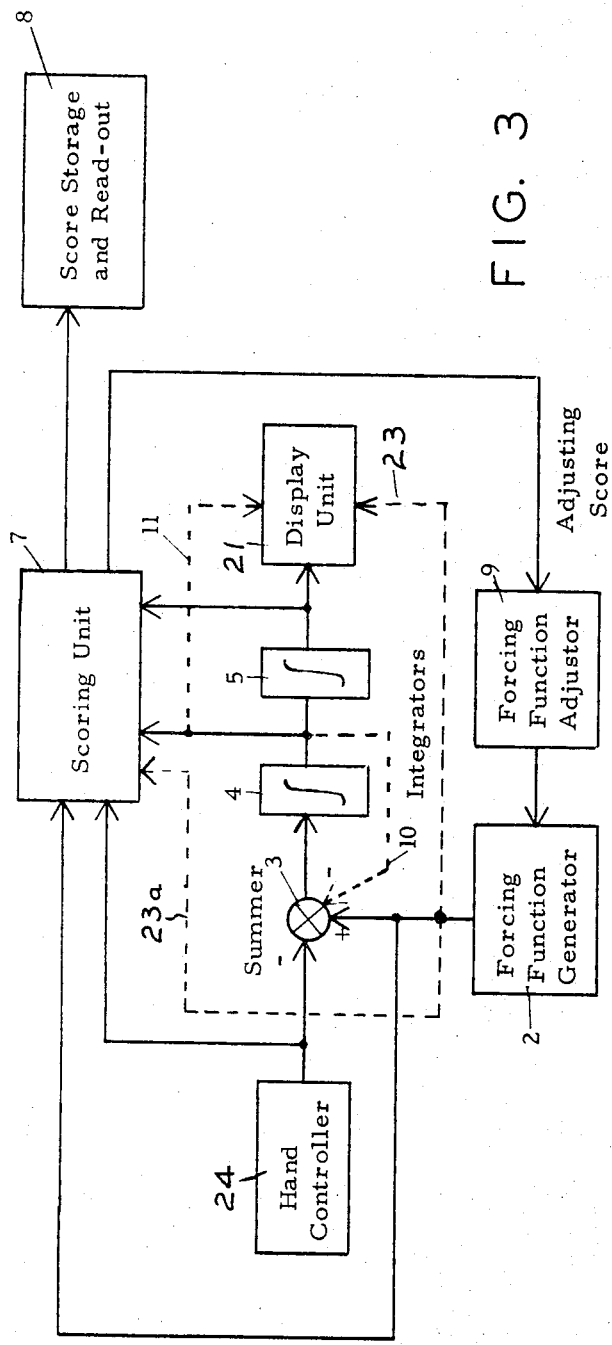
Figure 4:
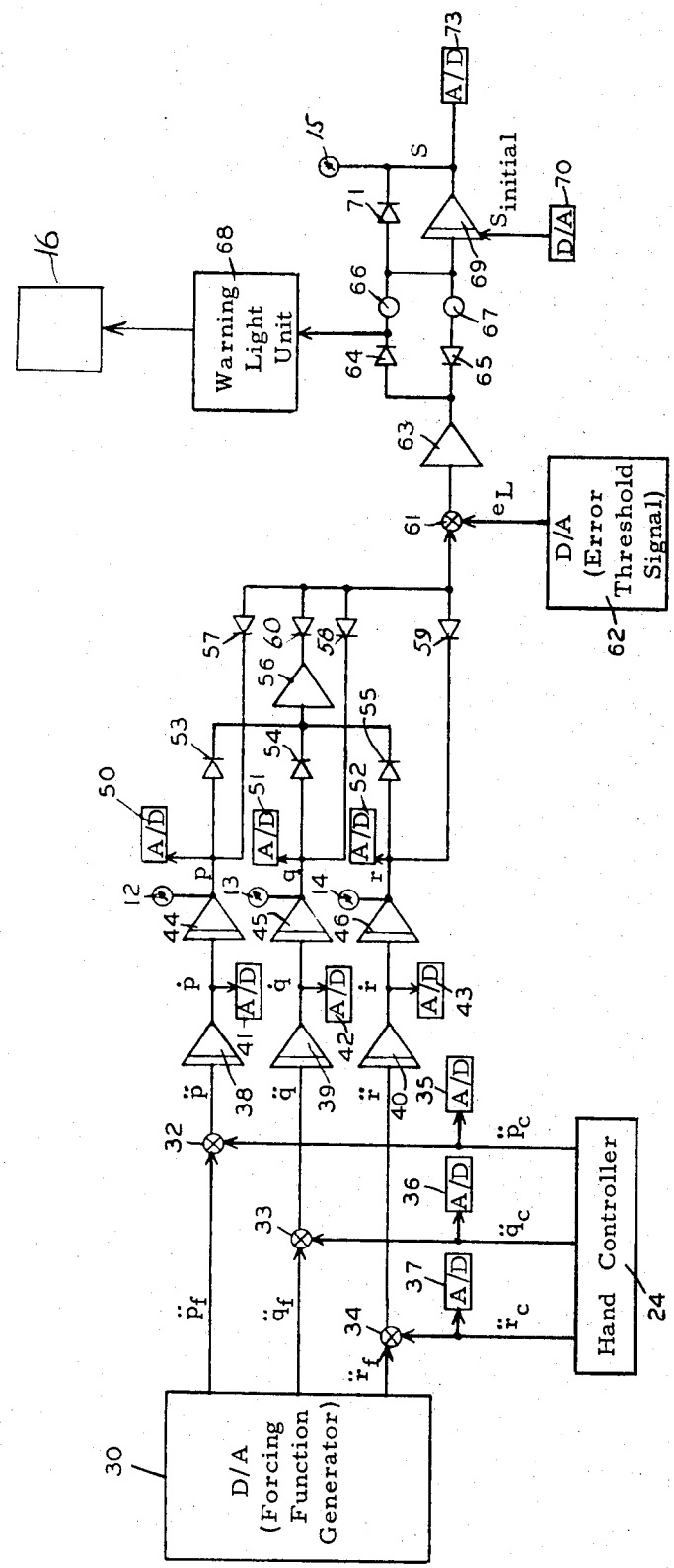
Figure 5:
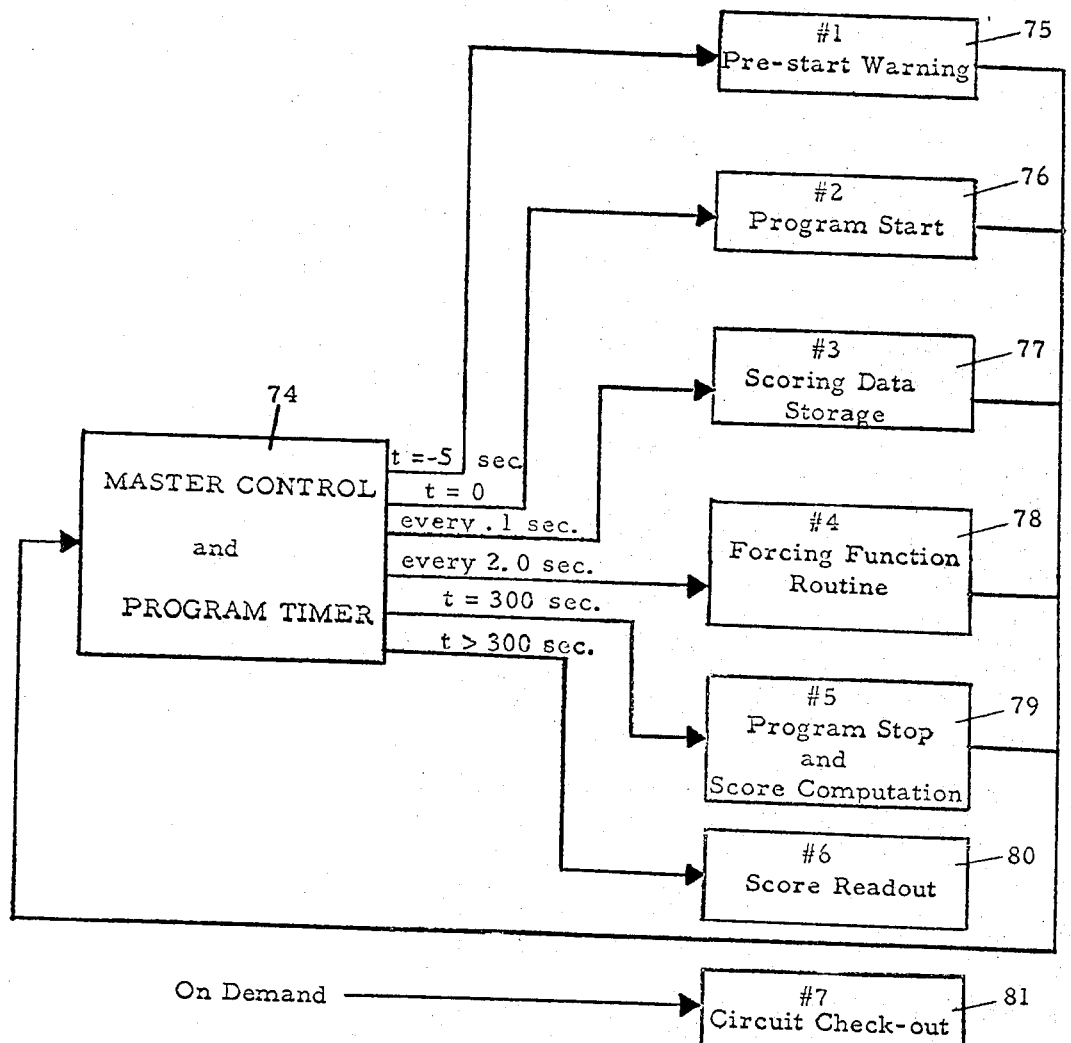

The structure, organization and operation of the invention will now be described more specifically in the following detailed description with reference to the accompanying drawings, wherein:

FIG. 1 is a pictorial view of the entire apparatus showing the hand controller;
FIG. 2 is a view of the indicator panel;
FIG. 3 is a block diagram of one channel of the apparatus;
FIG. 4 is a basic analog circuit for a three axes tracking test apparatus;
FIG. 5 is a digital timing logic for a tracking task, and
FIGS. 6 through 12 are program routine details of task number 1 through number 7 referred to in FIG. 5.

FIG. 1 shows the console configuration of the display unit and hand controller. Test console 22 may incorporate displays and controls for other tests, as well as for that of the subject invention. A display unit 21 is located adjacent hand controller 24; an arm rest 25 positions the test subject's or operator's right forearm with respect to the hand controller. Start and stop buzzers 84, 108 (referred to later) are contained therein, as well as control switches, not shown.

Hand controller 24 is movable in three degrees of freedom, or directions, each producing a signal in each of its axes. Assuming the T-bar is gripped on top by fingers and thumb with the forearm in the arm rest 25, then a forward and backward (up-down) motion of the controller will produce a pull, or $p$-axis signal $\pm \ddot{p}_c$, a left and right motion of the controller will produce a $q$-axis signal $\pm \ddot{q}_c$, and twisting the controller in a clockwise and counterclockwise motion about the shaft will produce a rotation or $r$-axis signal $\pm \ddot{r}_c$.

Available controllers include on-off and proportional types, with one, two, or three axes. Any of these may be desirable for some applications. The proportional hand controller may be of the spring-centered displacement type, in which case the displacement of the controller in each axis is usually transmitted mechanically into a potentiometer setting. Another available form of proportional controller employs an isometric or "stiff" action, with the force applied being transduced into an electrical signal, for example via a strain gauge pick-off. On-off ("digital") controllers generally utilize double-throw center-off switches in each controller axis.

FIG. 2 shows the display unit, in detail, for a three-axis test, the output (or "error") in the three axes of the task being labelled $p$, $q$, and $r$ to be displayed on meters 12, 13 and 14, respectively. Signals $p$, $q$, and $r$ are formed by double integrations of the hand controller signals from the corresponding axes of the three-axis controller, plus forcing function signals, as will be described. Meter 15 displays $S$, the "self-adjust" score, and because of the nature of that score, is proportional to the mean amplitude of the forcing function. (The basic forcing function signal is multiplied by this score before entering the system.) Indicators 12, 13, 14, and 15 all consist of milliammeters or microammeters; 12, 13 and 15 are side-mounted, and 14 is the flush-mounted type. Meters 12, 13, and 14 are zero center types. Meters such as these are standard catalog items of a number of manufacturers. Alternatively, cathode ray tubes with moving pips, or symbols, or other display techniques, may be used. For illustration, one of the meters, meter 12 is shown with a pair of indicators, 12a, 12b, one of which may be used in connection with the pursuit display.

A warning or alarm light 16 goes on whenever an error tolerance is exceeded in p, q, or r. The light thus has an alerting function. The light goes off whenever error in all three axes is brought within tolerance.

Digital read-out 17 is associated with a four-position selector switch 18, to provide the subject with summary score information on his total performance (T) and on his performance in the three axes separately, as called for via selector switch 18. This selector switch should be equipped with a spring return that will bring it back to position T after an individual axis score has been called for. The function of read-out 17 is both to tell the subject his overall level of performance, and in addition to inform him when there is any marked imbalance among axes in his performance, e.g., whether his performance in one axis is much worse than in the other two. Many varieties of electronic digital displays 17 and of selector switches 18 are available.

The final items of the display unit are indicator light 19 and pushbutton 20. These are not part of the test per se, but refer to a check-out routine for it. Pushbutton 20 initiates a check-out program which, if completed successfully, will cause signal light 19 to turn on for a brief period (e.g., 5 seconds). If check-out reveals a malfunction in the test, signal light 20 will fail to light.

A pursuit display may be provided on the display scales, on which the difference between actual output and the output of the forcing function (the desired output) is obtained, and scored. Two-indicator meters, as shown for the p-axis only (FIG. 2), may be used for all axes. One indicator, e.g. 12b represents desired output (forcing function) and the other, e.g., 12a, the actual output.

Details of the apparatus will now be described, with reference particularly to FIGS. 3 and 4.

FIG. 3 is a schematic block diagram of one axis of the test, which may have one, two, three, or even more axes. The hand controller 24 produces a signal when activated by the operator which is subtracted algebraically from a signal produced by a forcing function generator 2 by means of a summer 3. The negative of a third signal may also be summed into 3 as indicated by the dotted line 10, this being an optional "rate damping" signal. Each signal is assumed to be scaled to an appropriate order of magnitude prior to being summed at 3.

The output of the summer 3 is a signal corresponding to "error acceleration," which is integrated once by first integrator 4 to form an "error rate" signal which, as has been indicated, may be fed back negatively into the summer 3 via the dotted signal path 10 if a rate damping term is desired. A second integrator 5 receives the rate signal and integrates it to form the system "error," which is displayed on one of the scales 12, 13, 14 of display unit 21 to provide the test subject with the information he requires to introduce corrections to this "error" via hand controller 24 (FIGS. 1, 3). The test subject is instructed to minimize the error signal displayed to him. An optional error rate display may be provided to the subject, in which case it receives its signal via dotted signal path 11. The forcing function signal itself may be applied via line 23, to display unit 21, when a pursuit display is desired, and via line 23a to the scoring unit 7 since the error to be scored is the difference between the forcing function (desired output) and the actual output for each axis.

The scoring unit 7 receives, stores, and accumulates signals corresponding to the output of the hand controller 24, the forcing function generator 2 and the output of each of the two integrators, 4 and 5, which information is processed to form scores, and is stored for read-out by means of score storage and read-out 8. The primary score is the error, i.e., the score corresponding to the output of integrator 5. The scoring unit 7 forms a score which is a function of this error, which in turn is transmitted to the forcing function adjuster 9. As a result, an adjustment is made in the forcing function generator 2 to alter the forcing function, such that the task is made more difficult when the subject is performing above a performance standard, and less difficult when he is performing at less than standard. Different kinds of forcing functions could satisfy the requirement to provide an adjustable disturbance to be tracked by the subject. Tracking task forcing functions have traditionally been produced by combining non-harmonic sinusoidal signals; a usual second-choice procedure has been to generate "random noise" and then to employ filters to define an appropriate frequency spectrum. The third, and in many ways preferred, choice for the proposed system is a forcing function consisting of step-function changes which can vary in frequency or amplitude. Whatever forcing function is employed, it may be entered in four different ways into the system represented by the diagram of FIG. 3:

(1) As shown, i.e., summed into the input to the first integrator 4.
(2) Summed into the output of integrator 4, to be entered with that signal in the second integrator 5.
(3) Summed into the output of the second integrator 5 to provide an error signal formed by the combination of forcing function and output of that integrator on a one-signal "compensatory" display.
(4) Displayed separately on a two-pointer "pursuit" display on unit 21 (FIG. 1), in which the subject attempts to track the signal produced by the forcing function generator with the signal he produces through the integrators.

In the first case, the forcing function is an acceleration disturbance analogous to disturbances in "force" or "thrust" in a vehicle. Number two involves disturbances in rate, while the third and fourth are direct changes in the desired output, corresponding to an output "program" such as a changing road or path to be followed.

Tests of various forcing functions have indicated that one of the simplest of the various possibilities is as effective as any, so a preferred forcing function consists of a constant frequency random or pseudo-random amplitude signal, the gain (mean amplitude) of which is adjusted via forcing function adjustor 9 prior to entry of the signal into summing junction 3. The random or pseudo-random amplitude steps can be formed by many known techniques, including a pseudo-random number program in a digital computer. Tape or other storage of the output of such a program can be employed if the computer is not used on-line while the test is in progress.

Any device which can make the forcing function more or less difficult to follow can serve as forcing function adjuster 9. The adjuster will usually vary either the frequency or amplitude, or both, of the forcing function in accordance with the score signal, so that an increase results from performance better than a pre-established standard, a decrease from performance poorer than the standard. When performance is exactly at the pre-set standard, the forcing function does not change. The effect of this automatic adjustment technique is to tell how large a (mean) forcing function amplitude the subject can handle with a prescribed (standard) amount of error. Thus, the system measures how difficult a tracking or manual control problem can be handled at a fixed level of error, rather than how much error is produced in response to a tracking or manual control problem of fixed difficulty.

When the forcing function is produced by a pseudo-random number generator in an on-line digital computer, the amplitude adjustment is conveniently made by a digital multiplication of the appropriate pseudo-random number by a number corresponding to the score. When the forcing function is produced in the form of a voltage in an analog circuit, amplitude adjustment is conveniently made by means of an analog multiplier which generates the product of the basic forcing function and a scaled score signal received from an analog scoring circuit, which circuit is in this case part of the scoring unit. Both methods of adjustment are well known in the art and not specifically illustrated.

The scoring device 7 must not only form the basic score to activate forcing function adjuster 9, but also must process and form for storage any additional scores that are to be employed. The number of possible scores that might be of value is large, including, for example:

(1) Basic frequency of hand controller signal.
(2) Mean (absolute) amplitude of hand controller signal.
(3) Mean absolute amplitude of rate signal.
(4) Mean amplitude of forcing function (mean level of adjustive signal).
(5) Number of reversal errors (i.e., where the controller is moved in the wrong direction by the subject).
(6) Coefficients of the human operator "transfer function," including coefficients of first and second order lead and lag terms in response.
(7) Interaction of scores between or across axes in a multi-axis test.
(8) Changes in the above measurements with time during the course of the test.

Scores can be obtained via analog, digital, or hybrid circuits.

The integrators 4 and 5 can be analog computer components which incorporate initializing, hold, and over-load-protection circuits. The latter are necessary, as subjects are likely to exceed scale quite frequently if normal analog computer scaling of the circuit and display is employed.

An alternative instrumentation would be appropriate when a digital computer of appropriate speed and capacity is available on-line. All functions indicated in FIG. 3 can be carried out digitally. Where both digital and analog functions are employed, signal conversion is required. For example, if only the display and control signals are in analog form, digital to analog conversion is necessary to provide the display signal (or signals) and analog to digital conversion is required to enter the signal produced by the hand controller into the digital computer. Hybrid instrumentation employing both digital and analog equipment will be described for the typical embodiment of the invention.

FIG. 4 shows an analog circuit with the analog to digital and digital to analog conversion. The A/D converters shown passively sample analog voltages, to be stored as numbers in a digital computer, not shown.

Disturbance (forcing function) voltages $\ddot{p}_t$, $\ddot{q}_t$, and $\ddot{r}_f$ are produced by a digital computer (not shown) and enter the circuit via 3-channel digital to analog unit 30. Three-axis hand controller 24 is manipulated by the subject to produce voltages $\ddot{p}_c$, $\ddot{q}_c$, and $\ddot{r}_c$, by means of which errors observed by the subject are corrected. The three hand controller voltages are summed with the corresponding forcing function voltages at summing junctions 32, 33, and 34 (corresponding to summer 3, FIG. 3); they are sampled in analog to digital converter 35, 36, and 37, respectively. The summed signals, $p$, $q$, and $r$, are integrated once by integrators 38, 39, and 40 (integrator 4, FIG. 3) as indicated. They may be sampled digitally; analog to digital converters 41, 42, and 43, respectively, provide digital output. The integrated signals are each integrated again in integrators 44, 45, and 46 (integrator 5, FIG. 3) to produce the basic tracking signals $p$, $q$, and $r$, respectively. These signals are displayed on meters 12, 13, and 14 (FIGS. 2, 4). The same signals are also sampled for storage and subsequent readout; for storage in a digital computer, not shown, respective analog to digital conversion units 50, 51, and 52 are provided.

Diodes 53, 54, and 55 select from $p$, $q$, and $r$ the signal which is most positive to be inverted by unity gain inverter 56. The output of amplifier 56 and $p$, $q$, and $r$ are then brought to a second diode selector circuit formed by diodes 57, 58, 59, and 60, which passes the most negative of the four signals. The total effect of the seven diodes and the inverter (53 through 60 inclusive) is to produce a rectified "error" signal corresponding to whichever is greater in absolute magnitude at a given instant, $p$, $q$, or $r$. The score developed from such a signal is affected only by the largest of the three axis errors, and is unaffected by the size of the two signals of lesser magnitude. This scoring technique forces a subject to maintain good control in all three axes simultaneously, since absolutely nothing is gained by controlling well in one or two axes at the expense of the third.

The rectified error score is summed at 61 with an error threshold score which is obtained from the digital computer via digital to analog converter 62. The error threshold is in the form of a positive voltage, normally a predetermined constant, while the error score will always be negative at 61 with the given arrangement of diodes and inverting amplifier 56. Thus the input signal reaching the summing amplifier 63 may be positive or negative; when it is positive, $p$, $q$, and $r$ are within tolerance (each is smaller than the error threshold signal) and the subject's score, S, is improving; when this signal is negative, at least one axis is out of tolerance (larger than the error threshold signal), and the subject's score, S, is decreasing. When the largest error signal is exactly equal to the error threshold signal, the voltages reaching summing junction 61 cancel, and the score remains unchanged.

The inverted signal from amplifier 63 is split into positive and negative components by diodes 64 and 65, which can be scaled independently by potentiometers 66 and 67. The reason for this is that otherwise, when an error threshold is employed that is small relative to the range of the $p$, $q$, and $r$ signals, the score could improve only at a rate in proportion to the relatively small error threshold signal, but could get worse in proportion to the much larger amount by which the error (be it $p$, $q$, or $r$) can exceed the error threshold. This may cause too much of an imbalance in the rate at which the score can improve as compared to the rate at which it can worsen. The scaling adjustments at 66 and 67 permit this imbalance to be adjusted.

Whenever any axis is out of tolerance warning light 16, FIG. 2, goes on. The warning light is shown at 68. It consists of a high gain amplifier which triggers the light whenever current flows through diode 64, which occurs whenever an axis is out of tolerance. When all axes are in tolerance no current will flow through diode 64, and the warning light is extinguished.

A scoring integrator 69 is provided. It is preferably preset to a desired starting value, "$S_{initial}$" via digital to analog converter 70. The score ranges from zero through the positive range of the scoring integrator; the integrator is prevented from becoming negative by diode 71 in its feedback path. The score is displayed via meter 15 (FIGS. 2 and 4). The score is also sampled via analog to digital unit 73, for storage and readout on display unit 17 when selector switch 18 is at T.

The digital portion of the example test may be handled by any digital computer, which may be time-shared, with other functions. The logic of the digital operations required for this test is diagrammed in FIGURES 5 through 12. The master control and program timer 74 initiates the appropriate program routines for all but one of the functions or operations under computer control, some seven of which are associated with the tracking test, as indicated.

Five seconds before the test begins, Pre-start Warning routine 75 is run. At the start of the test, Program Start routine 76 begins. Every .1 second during the test, data from the analog circuit are sampled for scoring purposes, by means of Scoring Data Storage routine 77, and every 2 seconds a new forcing function voltage is generated and fed to the analog circuit via Forcing Function routine 78. At the end of the test period which, in the illustrated example is planned to last 5 minutes, the test is halted and scores are computed via Program Stop and Score Computation routine 79. Score Readout routine 80 makes summary total and individual axis scores available for display. Circuit Check-out routine 81 is initiated by the subject or another operator rather than via the computer, to exercise the test unit in order to detect malfunctions.

The logic of routines 76–81 is detailed in FIGS. 6 through 12. All but the last of these routines are initiated by Master Control and Timer 74, which, therefore, is included to begin each of these routines.

Figure 6:
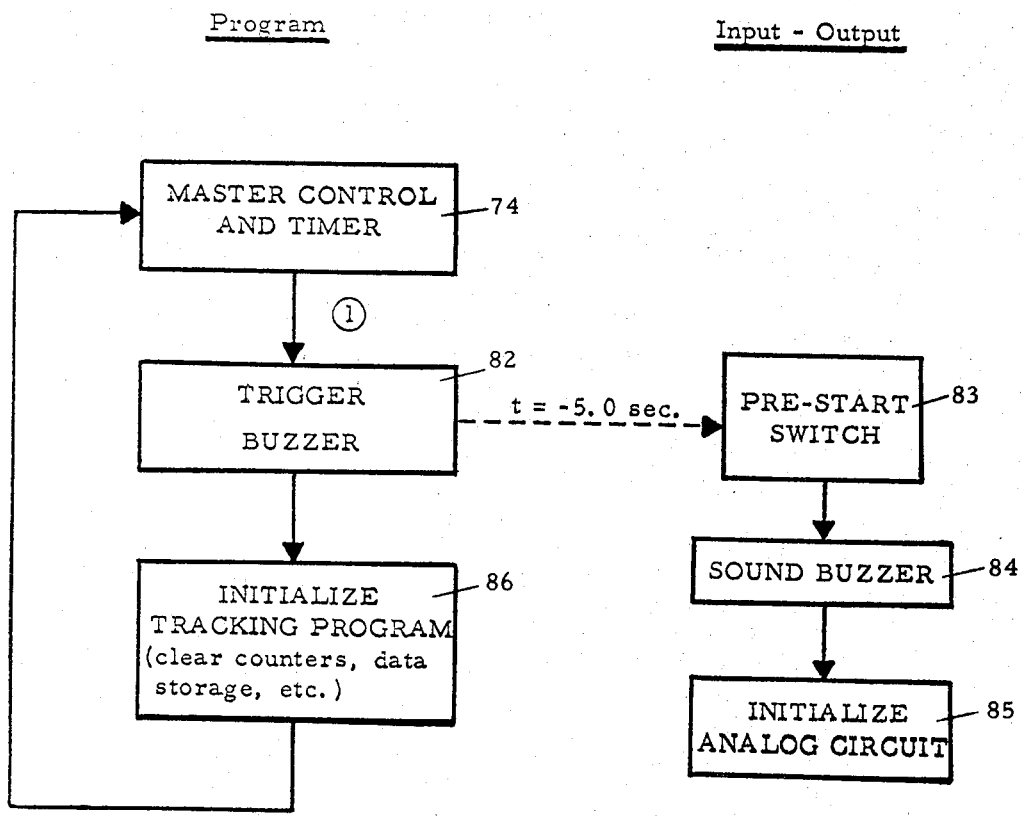

As shown in FIG. 6, 5 seconds prior to starting the tracking test Master Control and Timer 74 initiates the Pre-start Warning routine, which triggers a buzzer via digital instructions corresponding to 82, operating switch 83 which sounds a warning buzzer 84 and initializes the analog circuit 85 to ready it for operation. In the meanwhile, program instructions corresponding to 86 carry out the initialization of the various digital routines associated within the tracking test.

Figure 7:
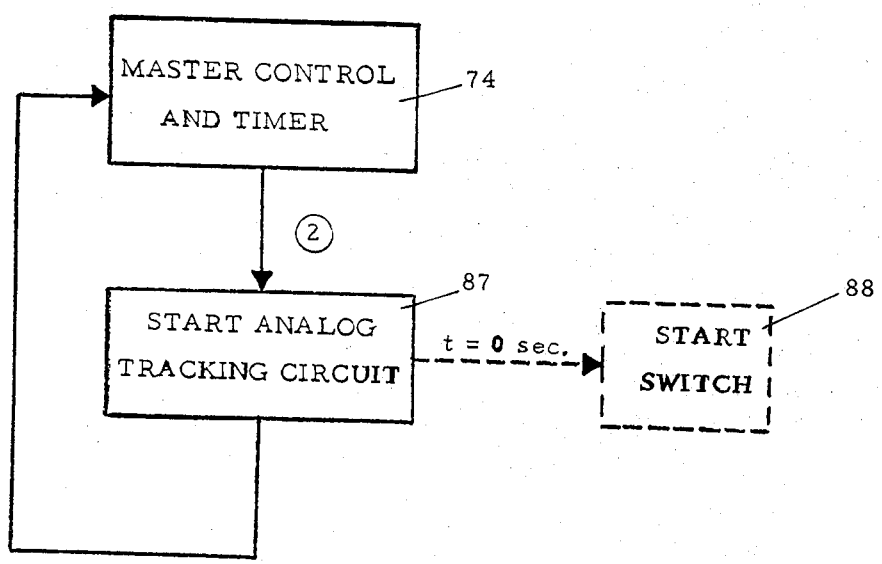

In FIG. 7 Master Control and Timer 74 initiates the start routine, in which instructions corresponding to 87 cause the analog circuit to be switched to "operate" via switch 88, to begin the test.

Figure 8:
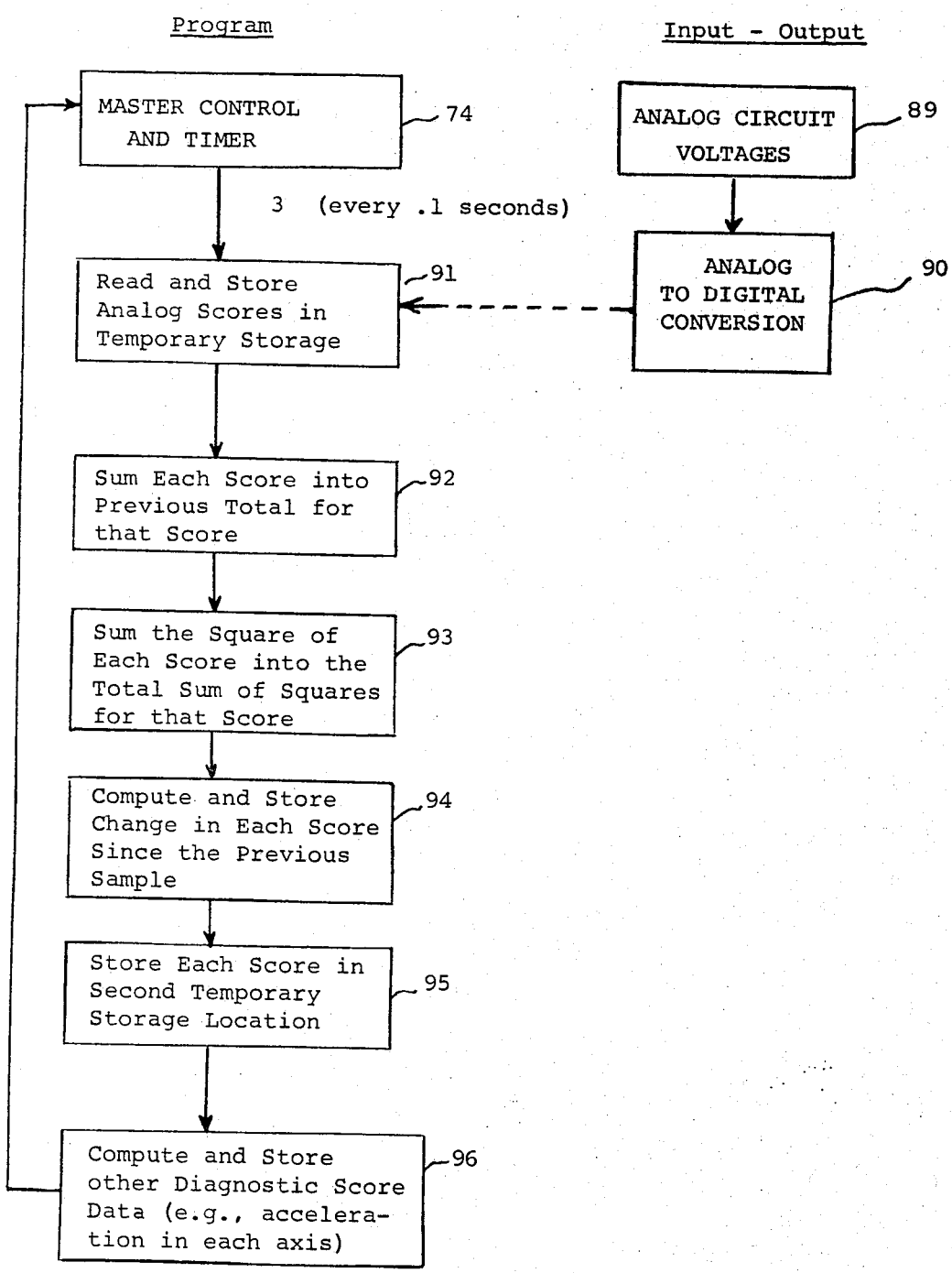

As shown by FIG. 8, Master Control and Timer 74 initiates the data storage routine every .1 second after the test begins. Ten analog circuit voltages—represented here as block 89, and shown in FIG. 4 as 35, 36, 37; 41, 42, 43; 50, 51, 52, and 73—are sampled and converted to digital form via analog to digital conversion equipment 90. The 10 separate A/D listings of FIG. 4 do not imply that a separate analog to digital converter is needed for each voltage to be sampled, of course, as the same conversion unit may be time-shared to sample the various voltages to be read into the computer. Block 91 instructions store the digital quantities representing the analog voltages ("scores") in temporary storage (not shown, and well known in the art) block 92 sums them with corresponding previous scores, block 93 squares each one and sums the squares with corresponding previous sums of squares. Block 94 instructions compute the change in each score since the last sample, and store the changes. The sampled scores are then moved to a second location via block 95 instructions, since data from the current and the preceding sample must be present in the machine to compute changes from sample to sample, and each new sample will wipe out previous data in the storage locations utilized in block 91.

From the data present in the computer after block 95 instructions are complete, a wide variety of scoring computations are possible. Block 96 refers to the instructions for such computations. Computation and readout of the following scores is readily possible:

(1) Self-adjust score at 30 second intervals
(2) Integrated absolute error in each axis
(3) Number of times during test that error tolerance is exceeded in each axis
(4) Mean absolute controller deviation in each axis (a score analogous to fuel consumption of a spacecraft)
(5) Number of controller reversal errors in each axis
(6) Excessive reaction times to displayed error, by axis
(7) Changes with time in components of response corresponding to displayed error, rate of change of error, and acceleration, by axis
(8) Controller coordination scores, e.g., the extent to which a subject makes simultaneous coordinated corrections in each axis, as opposed to correcting one axis at a time.

Figure 9:
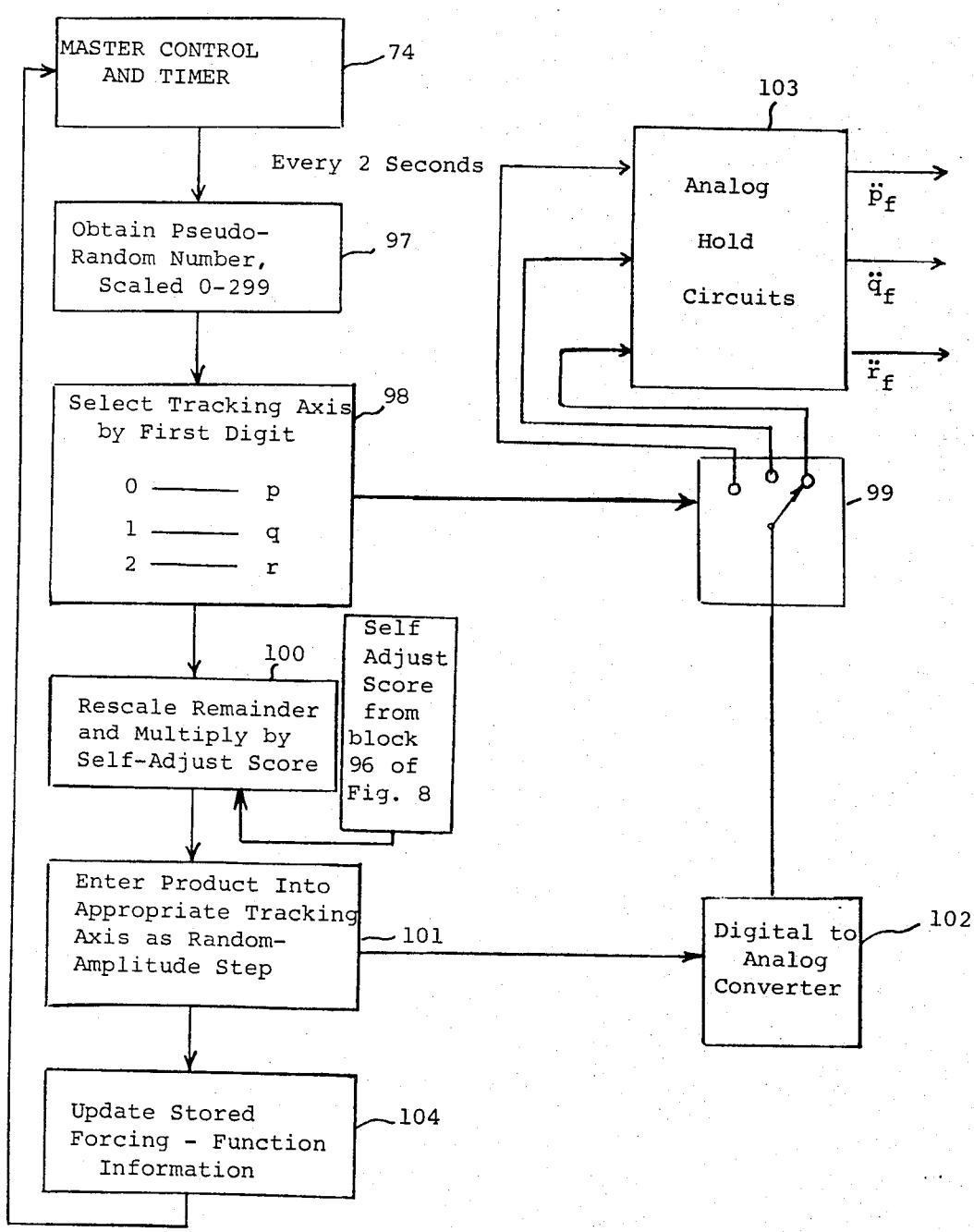

In FIG. 9, forcing function generation is initiated at the start of the test and every two seconds while the test is in progress by Master Control and Timer 74. The block of instructions indicated by 97 generate a pseudo-random number, rectangularly distributed and scaled to range from zero (000) to 299, employing one of the standard techniques for digital computer generation of pseudo-random numbers. The block 98 instructions set three position switch 99 to connect into one of the three channels, p, q, and r, corresponding to inputs to the three separate axes of the task, depending on whether the first digit of the pseudo-random number is zero, 1, or 2. The remainder, a pseudo-random number now scaled from 0 to 99, is re-scaled via block 100 instructions by subtracting 49.5 to make the distribution symmetrical about zero, and after which the result (ranging from −49.5 to +49.5) is multiplied by the current self-adjust score via block 100 instructions. (The self-adjust score is read into the computer in the form of a positive number each .1 second from block 96 of the data storage routine of FIG. 8.) The product of the scale pseudo-random number and the self-adjust score is proportional to the actual voltage entered into the analog circuit via block 101 instructions, digital to analog converter 102, switch 99, and analog hold circuits 103, which circuits are here conceived of as an adjunct to the digital to analog converter, and are needed to maintain the voltage level at that which is ordered periodically from the computer. The voltages from these hold circuits are then identical with the outputs of forcing function generator 30 of FIG. 4. Their effect is to cause disturbances in the tracking task which the subject must correct for—disturbances that are random (actually pseudo-random) in amplitude, sign, and in the axis disturbed. Following the entry of each new disturbance voltage into the analog circuit, information as to the voltage and the axis disturbed may be stored for use in score computation via block 104 instructions.

Figure 10:
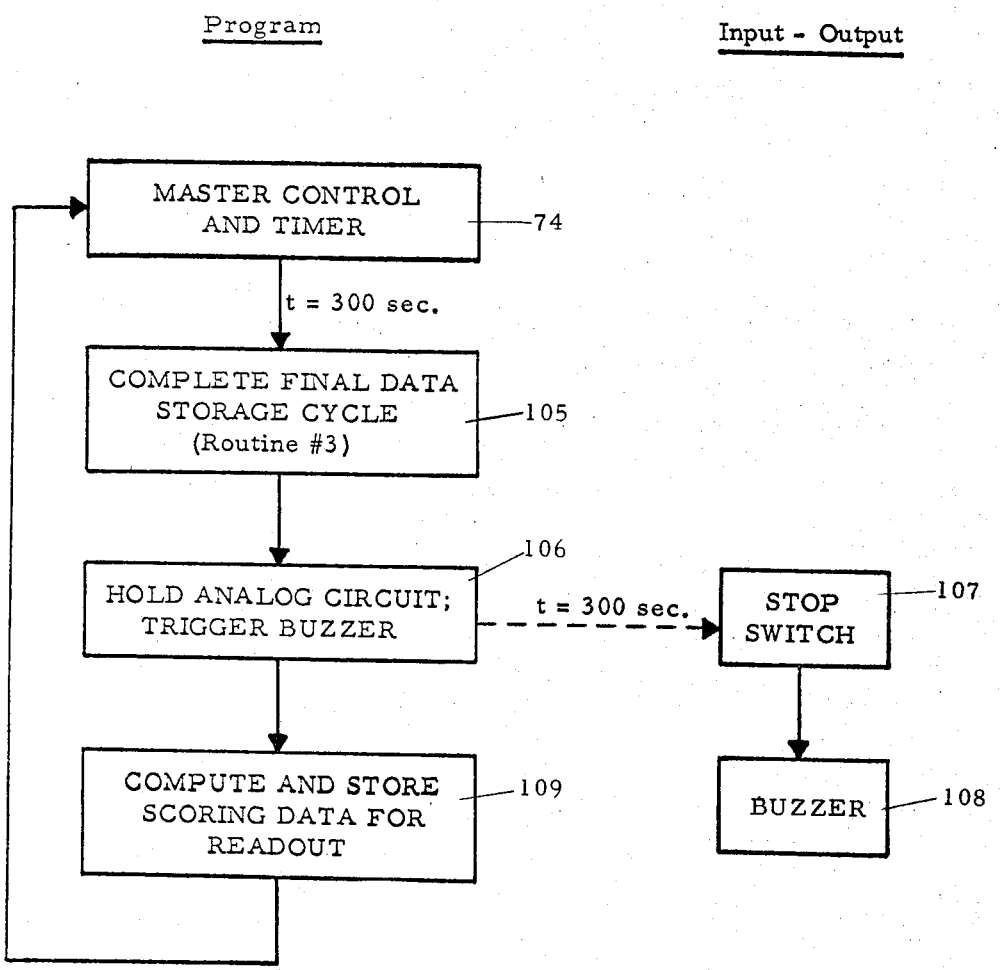

Three hundred seconds after the start of the test, Master Control and Timer 74 initiates the program stop routine shown in FIG. 10. The block 105 instructions switch the computer into the stop routine following the final data storage cycle (FIG. 8). Block 106 instructions program analog circuit stop switch 107, which also triggers buzzer 108 briefly. Block 109 instructions then enable computation of scores and other performance data to be preserved from the test, and store those data in the correct location for read-out, print-out, or remote transmission as desired.

Figure 11:
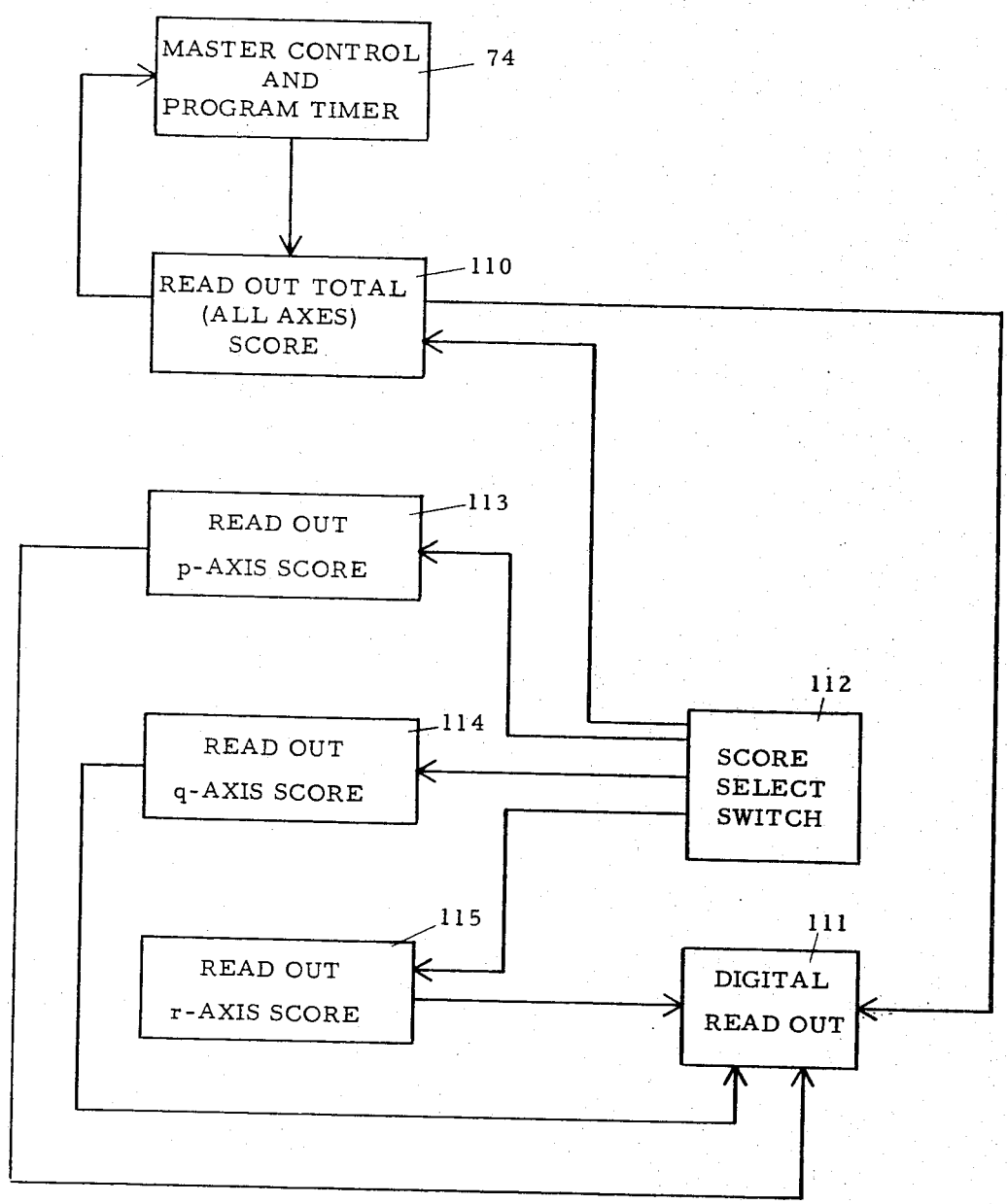

As shown in FIG. 11, the total summary score is displayed shortly after the test, while individual axis scores can be called for by use of switch 18, FIG. 2. Master Control and Program Timer 74 initiates instruction block 110 shortly after the test ends. Block 110 causes the total to appear on digital read-out 111, which corresponds to indicator 17 in FIG. 2. The individual axis scores are called for on demand by selector switch 112, which appears as 18 on FIG. 2. The normal switch position is such as to give the total score read-out, and a spring return brings it back to this position after individual axes have been read. By use of this switch, instruction block 113 will call for read-out of the p-axis score, block 114 for the q-axis score, and block 115 for the r-axis score, respectively.

Figure 12:
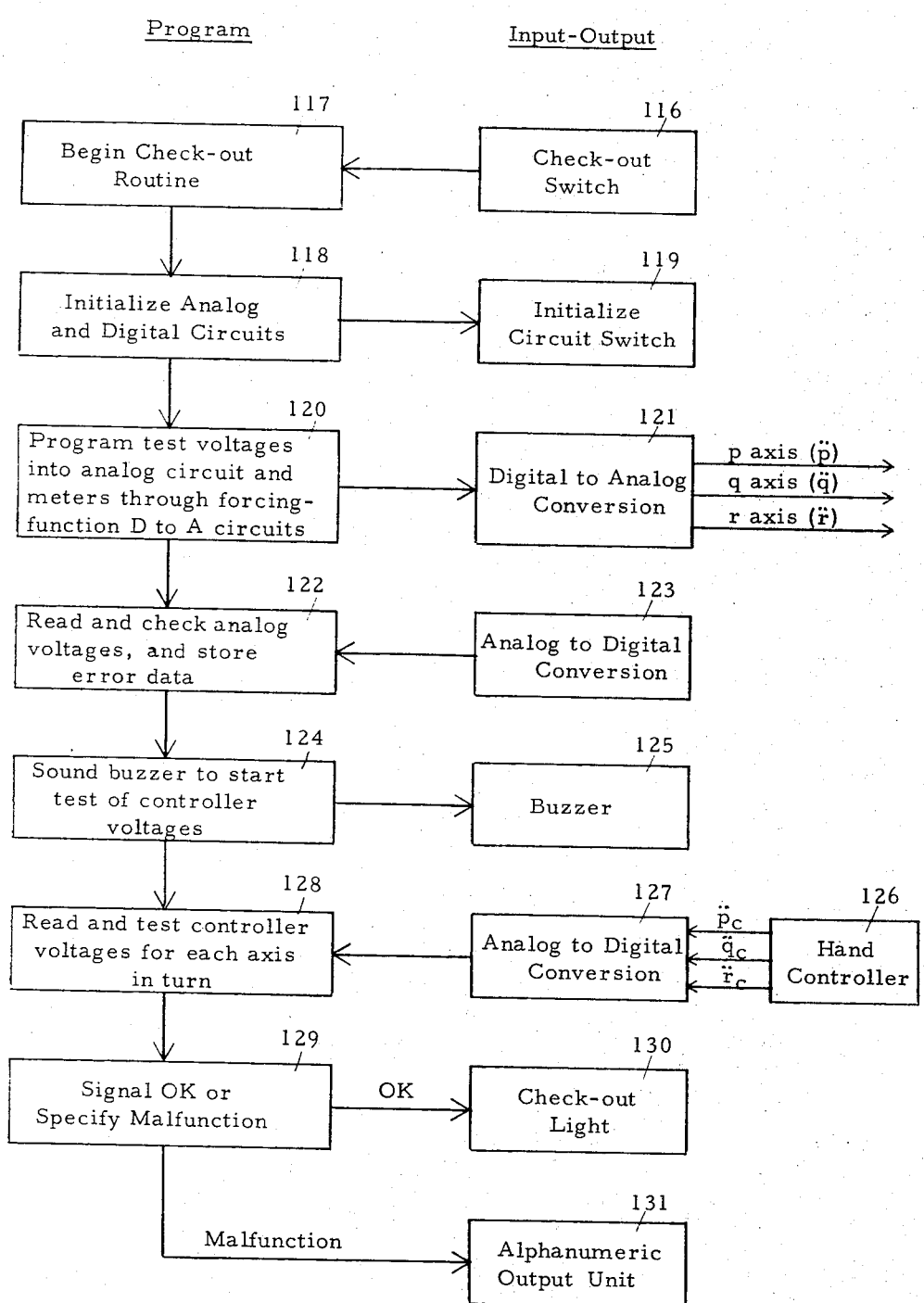

FIG. 12 shows a check-out routine that is initiated on demand to detect or diagnose malfunction in the equipment, utilizing already present input-output equipment. The check-out routine is started by switch 116, which is pushbutton 20 of FIG. 2. This begins the digital computer program via instruction block 117, which proceeds to energize the digital and analog circuits for the check-out routine via block 118 and analog start switch 119, which is also utilized to start the analog circuit in the pre-start routine, FIG. 6, block 85. The instructions for block 120 then program a sequence of test voltages into each axis of the analog circuit via digital to analog conversion equipment 121, the channels employed being identical with those of forcing function generator 30, FIG. 4. At fixed intervals, the analog circuit voltages are sampled via analog to digital conversion equipment 123 at all the A/D sampling points shown in FIG. 4, i.e., 35, 36, 37, 41, 42, 43, 53, 54, 55, and 73. Each voltage is checked against what it should be for the test program, and error data stored. Then block 124 instructions trigger buzzer 125, calling for the operator to move hand controller 126 to maximum displacement in both directions in each axis. The outputs of the controller during this exercise are sampled via analog to digital conversion equipment 127, the channels being 35, 36, and 37 in FIG. 4. Error data in this channel is also stored. Finally block 129 instructions indicate that errors are all within tolerance by switching on check-out light 130, which is display light 19 in FIG. 2, or they specify the out of tolerance condition via the computer's alphanumeric output unit 131. Either alternative marks the end of the check-out routine.

The digital computer equipment above referred to has not been shown in the drawings nor illustrated in detail, since any well known general data processing equipment will be suitable. The particular display overload, programming and storage techniques likewise are not shown in the drawings or described in detail, since they can be instrumented readily by analog, digital, or hybrid computing means well known in art. In each case, the tests provided to the operator by the apparatus according to the present invention, however, will be the same.

The apparatus of the present invention thus provides a hand controller 24 movable in one, or more directions, for example $p$, $q$, and $r$; for each degree of freedom, a signal channel corresponding to the number of directions is provided. Each one of these channels, if more than one, transmits signals representative of the position, and motion of the hand controller 24 in the respective plane. These signals may be proportional to the departure of the controller from a center, or zero position, or they may be ON-OFF, upon departure of the controller beyond a certain distance from the center, or zero position.

The forcing generator 30 generates disturbance signals, which may be random or pseudo-random both regarding their frequency, amplitude, and occurrence in the respective channel. The disturbance signals and the hand controller signals are combined, that is summed, in summing units 32, 33, 34 (FIG. 4). A derived signal is obtained which is integrated twice in integrators 38, 39, 40 and 44, 45, 46. The derived, integrated signal is displayed on indicators 12, 13, 14, one for each channel as desired, and it is the aim of the operator to move the hand control in such a manner that a certain relationship of the indicator with respect to a reference is established, for example by keeping the indicator at null or zero, or by keeping it aligned with another indicator movable in accordance with the signal generated by the forcing function generator 30. Additionally, an error score is computed determining a characteristic of the deviation of the actual signal indicated from the reference. This error score is sent back to the forcing function generator 30 in such a manner that the amplitude, or frequency of the disturbance signal is decreased if the error is large, and is increased if the error is small. The size of the error itself can readily be determined by comparison of the deviation signal with a certain reference, or threshold, which defines a certain tolerance of error.

The maximum of the deviation signals of each channel is determined in diodes 53, 54, 55, summing amplifier 56 and diodes 57, 58, 59, 60; this maximum is preferably used to determine the score of the test subject, and also to control the forcing function generator, in order to provide for uniform efforts on the part of the operator to maintain the indicator in its predetermined relationship to the reference in all directions of freedom, and not only in one or the other.

While there have been described and illustrated certain specific embodiments of the present invention, it will be apparent to those skilled in the art that further changes and modifications may be made without deviating from the broad principle and intent of this invention, which shall be limited only by the scope of the appended claims.

I claim:

1. A psychomotor performance testing apparatus comprising a movable hand controller having freedom of movement in at least one plane; a signal channel, one for each plane of movement, each channel transmitting signals representative of the position of said hand controller in a respective plane; a forcing function generator generating disturbance signals of controllable characteristic; means combining said disturbance signals into at least one of said signal channels to obtain a derived signal; at least one indicator for each of said planes of freedom of movement to indicate deviation of applied signals from a predetermined datum, said indicators being responsive to said derived signals and displaying deviations of said derived signals from said datum; means measuring a characteristic of the deviation from said datum of each indicator and deriving at least one deviation signal representative thereof; and means applying at least one of said deviation signals to said forcing generator to control said forcing function generator to change the characteristics of said disturbance signal in accordance with the characteristic of the deviation from said datum.

2. Apparatus as claimed in claim 1 wherein said hand controller is movable in three directions: up-down, right-left, twist clockwise-counterclockwise; three signal channels are provided, one for each of said directions; and said combining means combines said disturbance signal into all said three channels.

3. Apparatus as claimed in claim 1 wherein said forcing function generator generates signals varying in frequency to provide a controllable characteristic.

4. Apparatus as claimed in claim 1 wherein said forcing function generator generates signals varying in amplitude to provide said controllable characteristic.

5. Apparatus as claimed in claim 1 wherein said forcing function generator generates signals varying both in frequency and amplitude.

6. Apparatus as claimed in claim 1 wherein said measuring means measures the maximum amplitude of deviation as a characteristic of deviation.

7. Apparatus as claimed in claim 1 wherein said measuring means measures the time during which a deviation from said datum of predetermined tolerance persists as a characteristic of deviation.

8. Apparatus as claimed in claim 1 wherein said measuring means measures the time and amplitude of deviation.

9. Apparatus as claimed in claim 2 including means determining the maximum deviation signal in any one of said channels, said maximum deviation signal being applied to said forcing generator.

10. Apparatus as claimed in claim 9 including alarm means responsive to said maximum deviation and giving an indication when said maximum deviation exceeds a predetermined value.

11. Apparatus as claimed in claim 1 including means generating an error threshold signal; means comparing said deviation signal with said error threshold signal and deriving a forcing control signal therefrom; said forcing generator being controlled by said forcing control signal to increase or decrease the degree of disturbance introduced into said channels in accordance with the magnitude of said control signal whereby, when the degree of disturbance results in deviation beyond a predetermined criterion, the degree of disturbance will be automatically decreased to make the task of minimizing the deviation less difficult and, when the deviation drops below certain values, the degree of disturbance may be increased to make the task of minimizing the deviation more difficult.

12. Apparatus as claimed in claim 1, wherein said combining means combines the disturbance signal in each of said channels separately.

13. Apparatus as claimed in claim 1, wherein said combining means combines said disturbance signal in all said channels simultaneously.

14. Apparatus as claimed in claim 11, said combining means including rate damping means.

15. Apparatus as claimed in claim 1 including timing means repetitively rendering said apparatus effective for a predetermined period of time; storage means storing a representation of the deviation during said predetermined period to record a test score; and accumulator means indicating cumulative deviation.

16. Apparatus as claimed in claim 15, said storage means storing representations of the deviation during said predetedmined period for each channel.

17. Apparatus as claimed in claim 15, said storage means storing a representation of the maximum deviation during said predetermined period of time in any one of said channels.

18. Apparatus as claimed in claim 15 including digital to analog and analog to digital computing components associated with each channel, said components being effective during said predetermined periods of time.

19. Apparatus as claimed in claim 1 for use in a pursuit test, including indicator means receiving and displaying separately said disturbance signal from said forcing function generator.

20. Apparatus as claimed in claim 1, said indicators being center-zero instruments indicating deviation from a center-null position.

21. Apparatus as claimed in claim 1, said combining means including a summing means summing said disturbance signals and said signals representative of the position of said hand controller in a respective plane; a first integrator and a second integrator, said first and second integrators being connected to integrate said signal from said summing means; said signal derived from said second integrator being applied to said indicator.

22. Apparatus as claimed in claim 21, including a third integrator means applying said signals derived from said second integrator to said third integrator; and means deriving a signal from said third integrator and applying said signal to said forcing function generator to adjust said forcing function generator in accordance with the total score as integrated by said third integrator.

References Cited

UNITED STATES PATENTS

| | | | |
|---|---|---|---|
| 2,023,488 | 12/1935 | Poppen | 35—22 XR |
| 2,341,678 | 2/1944 | Wickes | 35—22 XR |
| 3,311,995 | 4/1967 | Hudson | 35—12 |

EUGENE R. CAPOZIO, *Primary Examiner.*

W. H. GRIEB, *Examiner.*